Patented June 21, 1932

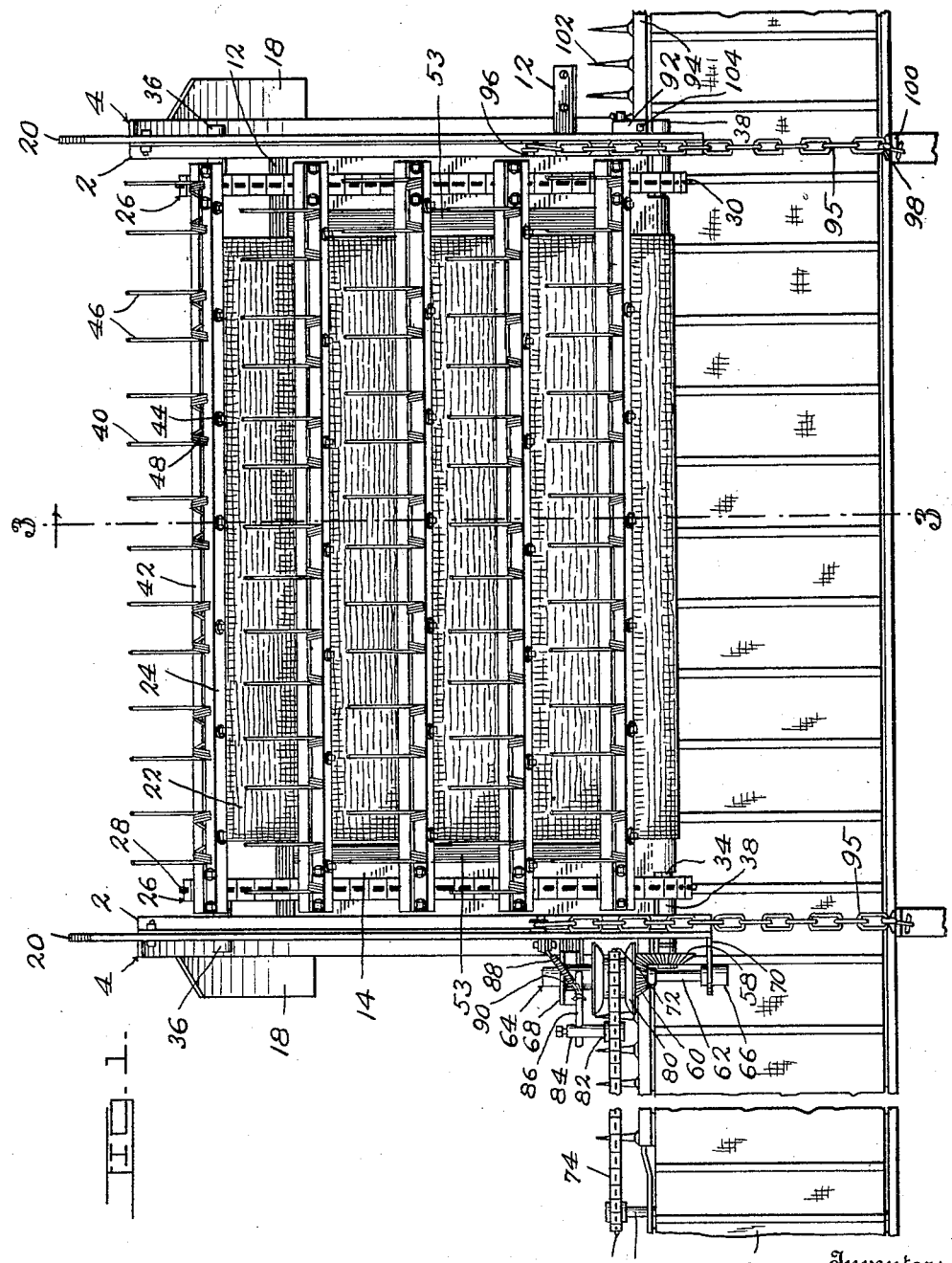

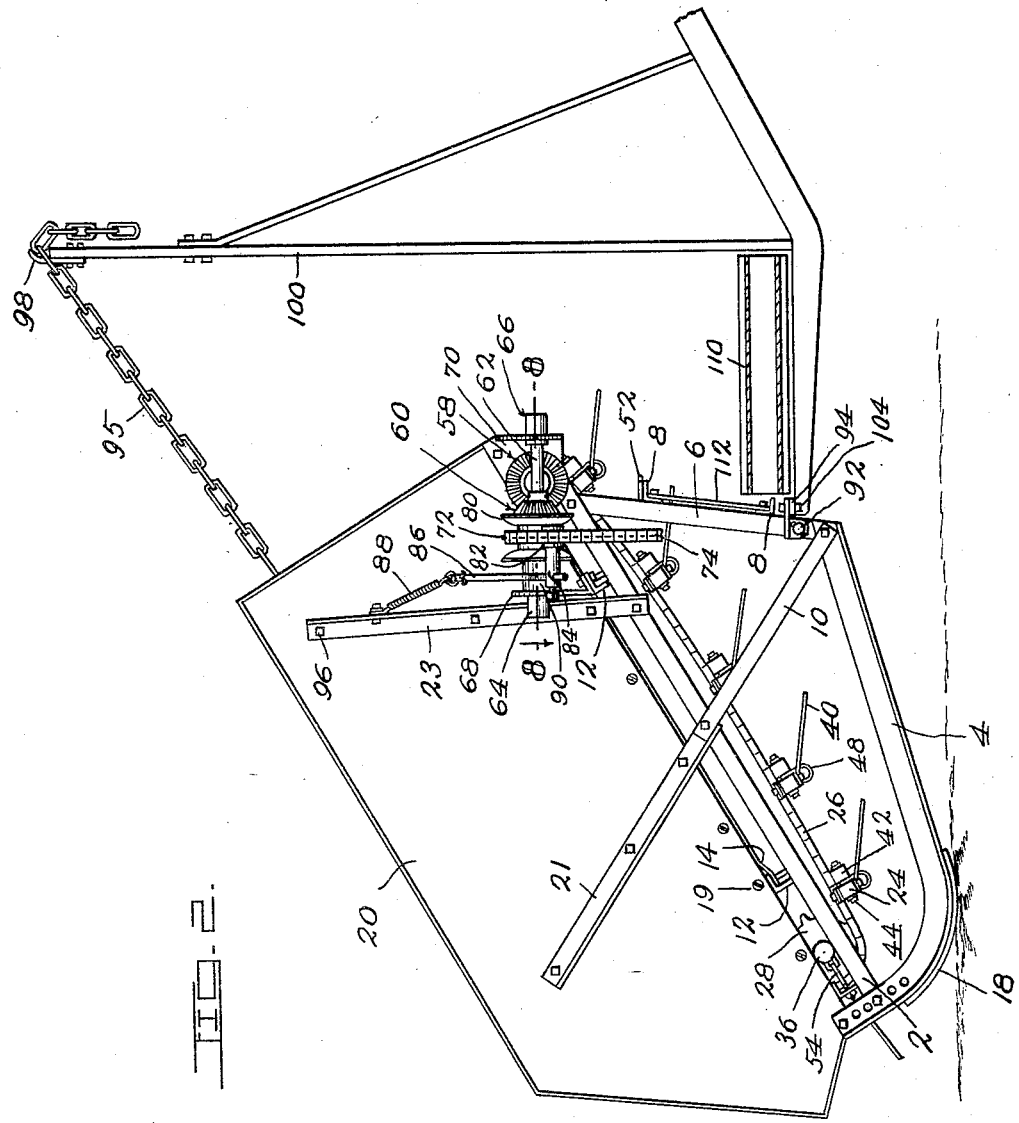

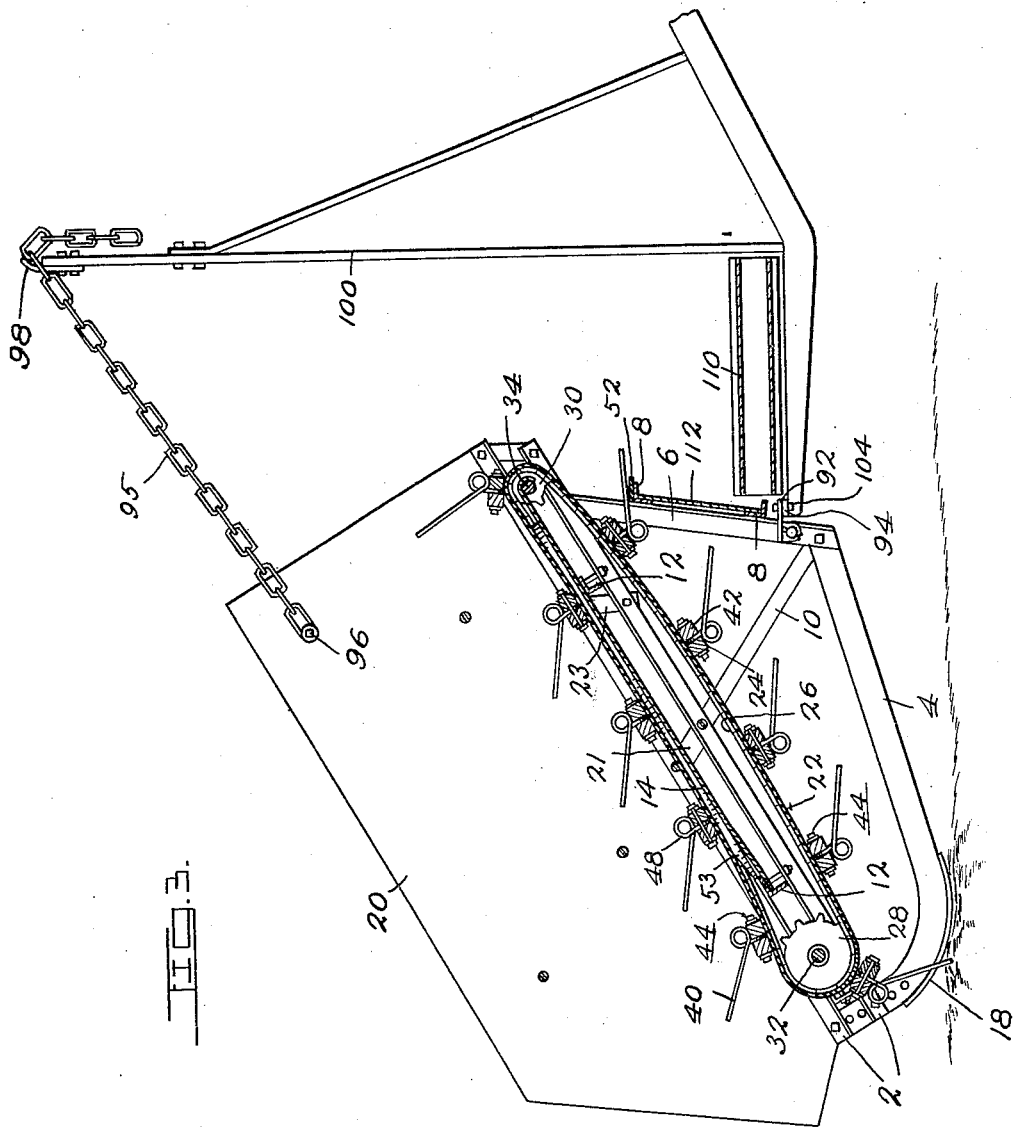

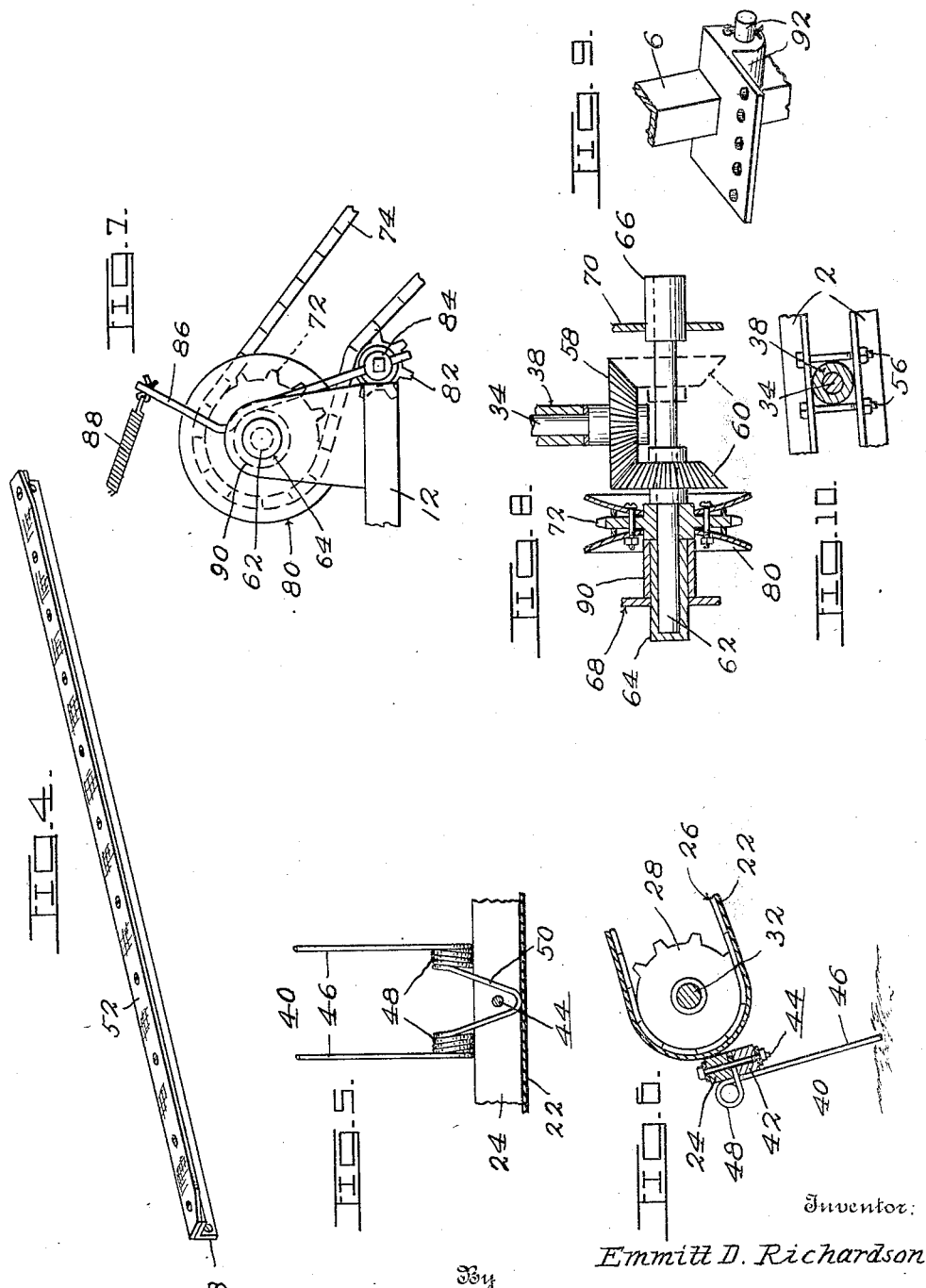

1,863,637

UNITED STATES PATENT OFFICE

EMMITT D. RICHARDSON, OF CAWKER CITY, KANSAS

PICK-UP MECHANISM FOR COMBINES AND THE LIKE

Application filed November 11, 1929. Serial No. 406,336.

My invention relates to pick-up mechanisms for combines and like agricultural machines and one object is to provide a new and useful mechanism of this character which can be readily attached to different makes of machines, for the purpose of gathering grain from the windrow and feeding it to said machines.

A further object is to provide a relatively simple and inexpensive pick-up mechanism which will gather the broken heads, containing the kernels, as well as the bulk of the grain so that there will be little or none left upon the ground.

Other objects will hereinafter appear and in order that the invention may be fully understood reference will now be had to the accompanying drawings, in which:

Fig. 1 is a plan view of the pick-up mechanism attached to the forward portion of the combine.

Fig. 2 is a side elevation of the pick-up mechanism attached to the combine.

Fig. 3 is a vertical longitudinal section on line 3—3 of Fig. 1.

Fig. 4 is a detail perspective of a stripper forming part of the invention.

Fig. 5 is a detail elevation of a portion of a rake mechanism employed in carrying out the invention.

Fig. 6 is a broken sectional view of the lower portion of an elevator mechanism forming an important part of the invention.

Fig. 7 is a side elevation of a part of the gearing for driving the elevator mechanism.

Fig. 8 is a horizontal section of the gearing on line 8—8 of Fig. 2.

Fig. 9 is a detail of one of a pair of hinges for operably connecting the pick-up mechanism to the combine.

Fig. 10 is a broken detail showing a bearing clamped to the frame of the pick-up.

In carrying out the invention I employ a suitable frame consisting in the present instance of two pairs of bars 2 arranged in parallel relation to each other and one bar of each pair arranged above its companion, a pair of runners 4 secured at their forward upturned ends to the respective pairs of parallel bars 2, a pair of arms 6 secured at their upper ends to the rear portions of the lowermost bars 2 and at their lower ends to the rear ends of the runners 4, transverse bars 8 secured at their ends to the arms 6, braces 10 secured at their lower ends to the juncture of the runners 4 and arms 6 and at their upper ends to the lowermost bars 2, and transverse bars 12 secured at their ends between the parallel bars 2.

The parallel bars 2 slope downwardly and forwardly and the major portion of the space between the two sets of bars is closed by a sheet metal apron 14 which is secured at its sides to the two uppermost bars 2. The apron 14 is also secured at its lower end to one of the transverse bars 12 and at its upper portion to the other transverse bar 12. The transverse bars 12 cooperate with the bars 8 in spacing the two sides of the frame apart. The lower curved portions of the runners 4 are equipped with fixedly mounted shoes 18 which are of sufficient width to prevent them from readily sinking into soft ground.

The sides of the frame are equipped with fenders 20 which act as wind guards in preventing the grain from being blown off of the elevator hereinafter described. The fenders 20 are secured to the bars 2 by suitable means such as bolts 19 and braces 21 and 23.

The elevator consists of an endless conveyer 22 and a traveling rake hereinafter described. The conveyer 22 consists of canvas or other flexible material which is equipped at regular intervals with fixedly secured transverse bars 24 spaced equal distances apart and firmly secured at their ends to a pair of endless sprocket chains 26 running over sprocket wheels 28 and 30 fixedly mounted upon shafts 32 and 34 journaled in bearings 36 and 38, respectively.

The rake consists of a plurality of teeth 40 for picking up the grain from the ground and throwing it upon the conveyer 22. The rake teeth 40 are removably secured to the bars 24 by clamp members 42 which are firmly drawn in place by suitable means such as bolts 44. Each set of rake teeth consists of a pair of prongs 46 wound at their lower portions upon coils 48 which are united by a loop 50 through which the respective bolts 44 extend. As shown by Fig. 1 the rows of rake teeth are arranged in staggered relation to each other so that they will leave little or no grain upon the ground traversed by the pick-up mechanism. Rails 53 are secured upon the apron 14 to support the bars 24 and the clamping members 42 as they travel upwardly with the conveyer 22.

A transverse stripper 52, secured to the uppermost bar 8, is arranged in the path of the rake teeth 40 for the purpose of relieving the latter of any straw or grain adhering thereto as said teeth pass downwardly and forwardly beneath the elevator. The stripper 52 consists preferably of rubber, leather or other flexible material which will not damage the rake teeth as they come into contact with said stripper as shown by Fig. 3.

The bearings 36 are slidably arranged between the lower forward portions of the parallel bars 2 and provided with tensioning devices 54 whereby they may be drawn forwardly to take up the slack in the sprocket chains 26, while the bearings 38 are clamped between the upper portions of the parallel bars 2, which latter are firmly drawn together at this point by suitable means such as bolts 56, see Fig. 10.

The upper shaft 34 is driven by a fixedly mounted bevel gear 58 intermeshing with a bevel gear 60 mounted upon a drive shaft 62 which is journaled in bearings 64 and 66. The bearing 64 is fixed to a bracket 68 which is secured to the adjacent end of the bar 12 while the bearing 66 is fixed to a bracket 70 secured to the upper portions of the two adjacent parallel bars 2.

The drive shaft 62 is provided with a fixedly mounted sprocket wheel 72 which is driven by an endless sprocket chain 74 running around a sprocket wheel 76 mounted upon a driven shaft 78 of the combine. The shaft 78 is preferably the one which is usually equipped with a crank or disk to which the pitman for driving the sickle bar is connected, but these parts are removed before my pick-up mechanism is connected to the combine. The sprocket wheel 72 is equipped with a pair of relatively large flanges 80 to prevent the chain 74 from leaving said sprocket wheel 72 when the latter is thrown out of line with the sprocket wheel 76 by the up and down adjustment, hereinafter described, of the pick-up mechanism. Slack in the sprocket chain 74 is taken up by an idler 82 mounted upon a stub shaft 84 carried by a bell-crank 86 controlled by a retractile spring 88 attached to the adjacent brace 23. The bell-crank 86 is fixedly mounted upon a sleeve 90 which is freely mounted upon the bearing 64.

On some combines the shaft 78 is driven in a reverse direction to the shafts of other combines so in order to meet this contingency and prevent the conveyer 22 and the rake mechanism from being driven in the wrong direction, I reverse the position of the bevel gear 60 as shown by dotted lines Fig. 8, so that it will drive the bevel gear 58 in the proper direction. The shaft 78 of some combines is also located at the right hand side of the cutting mechanism instead of at the left side as shown by Fig. 1, so I provide for this by reversing the position of the shaft 34 in order to locate the bevel gear 58 at the right side of the pick-up mechanism. I also change the position of the drive shaft 62 with its associate parts to the right side of the pick-up mechanism and in order to provide a support for the bearing 64 the uppermost transverse bar 12 is extended far enough to the right as shown by Fig. 1 to receive said bearing 64.

The arms 6 of the frame are provided at their lower portions with a pair of hinges 92 adapted to be bolted to a suitable portion of the combine, such, for instance, as the ledger plate 94. The hinges 92 provide means for operably connecting the pick-up mechanism to the combine and supporting the rear portion of said pick-up mechanism above the ground, its forward portion being supported by the shoes 18 which are free to follow undulations in the ground as the pick-up mechanism is advanced by the combine.

In order to prevent the shoes 18 from dropping into the deep depressions in the ground and thereby causing possible damage to the pick-up mechanism, I provide the latter with a pair of cables 95 which are connected at their forward ends to the fenders 20 and the braces 23 by suitable means such as bolts 96. The rear portions of the cables 95 are adapted to adjustably engage suitable means such as hooks 98 secured to the uprights 100 on the combine. If desired the cables 95 may be taken up sufficiently to lift the shoes 18 from the ground.

In practice the sickle bar and the reel of the combine are removed after which the pick-up mechanism is connected by the hinges 92 to the ledger plate 94 from which four of the sickle guards 102 have been removed to provide holes for the reception of the hinge bolts 104. Preferably, the pick-up mechanism is located about midway between the ends of the ledger plate 94 so that a relatively long chain 74 may be employed that will not be likely to run off the sprocket wheels 72 and 76 as the latter is thrown out of alinement with the former when the forward end of the pick-up mechanism is raised or lowered.

When the elevator mechanism is set in operation the rows of rake teeth 40 successively impinge against the ground and engage under the cut grain and lift it from the windrow to the conveyer 22, which latter coacts with said rake teeth in carrying the grain upwardly and depositing it upon the combine conveyer 110 for its travel to the threshing mechanism of the combine in the usual manner. As the lower ends of the rake teeth 40 come into contact with the ground they are forced slightly into the latter as shown by Fig. 6 and remain stationary until the respective clamp members 42 engage and push them forwardly and upwardly, which operation is accomplished with sufficient speed to cause said rake teeth to tear any matted grain apart so that it can be readily threshed by the combine. As the rear portion of the pick-up mechanism projects over the combine conveyer 110, as shown by Fig. 3, there will be little or no chance for any part of the grain to become lost by falling between said pick-up mechanism and said conveyer 110, but as a further guard against the loss of grain I provide the bars 8 with a shield 112 which will prevent any of the grain from falling forwardly off of the conveyer 110 after being deposited thereon by the elevator mechanism.

From the foregoing description it is apparent that I have provided a pick-up mechanism embodying the advantages above pointed out, and while I have shown and described one form of said mechanism I reserve all rights to such other forms and modifications thereof as properly fall within the spirit and scope of the invention as claimed.

Having thus described my invention, what I claim and desire to secure by Letters Patent, is:

1. In combination with a combine or like machine, a pick-up mechanism adapted to be arranged at the forward portion of said combine or like machine and consisting of a downwardly and forwardly inclined frame adapted to be connected to said machine, stripper means at the rear portion of said frame, gathering means supported on said frame and comprising a suitably actuated endless conveyer adapted to deliver material to the machine, and teeth projecting outwardly from said conveyer and having spring means whereby they are pressed against the stripper means as they pass the latter.

2. A pick-up mechanism of the character described consisting of a frame provided at its rear portion with a transverse bar, a flexible stripper supported by said bar, a suitably actuated endless conveyer supported on said frame, slats secured at spaced intervals to said conveyer, and teeth projecting outwardly from said conveyer and provided with spring means whereby they are pressed against the flexible stripper as they pass the latter.

3. A pick-up mechanism of the character described consisting of forwardly inclined parallel bars, means connecting said bars, runners having upwardly curved forward ends secured to the forward portions of said parallel bars, upwardly and rearwardly extending arms secured at their upper and lower ends to the rear portions of the parallel bars and said runners, respectively, a shield secured to said arms, and a suitably operated endless conveyer means arranged to travel between the parallel bars.

4. In combination with a combine or like machine having a ledger-plate and a conveyer, a pick-up mechanism consisting of forwardly inclined parallel bars having their rear ends projecting over said conveyer, an apron uniting said bars, fenders secured at their lower margins to said parallel bars, runners having upwardly curved forward ends secured to the forward portions of said bars, shoes secured to the forward portions of said runners, upwardly and rearwardly extending arms secured at their upper and lower ends to the rear portions of the parallel bars and said runners, respectively, and arranged adjacent to the forward portion of the ledger-plate, hinges operably connecting said arms to the ledger-plate, a shield secured to said arms and extending above the ledger-plate, and a suitably operated endless conveyer means arranged to travel between the parallel bars.

5. In combination with a combine or like machine having a ledger-plate and a conveyer, a pick-up mechanism consisting of forwardly inclined parallel bars having their rear ends projecting over said conveyer, an apron uniting said bars, runners having upwardly curved forward ends secured to the forward portions of said bars, shoes secured to the forward portions of said runners, upwardly and rearwardly extending arms secured at their upper and lower ends to the rear portions of the parallel bars and said runners, respectively, and arranged adjacent to the forward portion of the ledger-plate, hinges operably connecting the lower portions of said arms to the ledger-plate, a shield secured to said arms and extending above the ledger-plate, a flexible stripper at the upper portion of said shield, suitably operated endless conveyer means arranged to travel between the parallel bars and discharge upon the conveyer of the machine, and teeth arranged to travel with said endless conveyer means and contact said stripper means.

In testimony whereof I affix my signature.

EMMITT D. RICHARDSON.